US010639682B2

United States Patent
Higgins

(10) Patent No.: US 10,639,682 B2
(45) Date of Patent: May 5, 2020

(54) SURFACE CLEANING SYSTEM AND METHOD

(71) Applicant: XENSIT TRIBOLOGY B.V., Europoort Rotterdam (NL)

(72) Inventor: Malcolm Higgins, Oxfordshire (GB)

(73) Assignee: XENSIT TRIBOLOGY B.V. (NL)

( * ) Notice: Subject to any disclaimer, the term of this patent is extended or adjusted under 35 U.S.C. 154(b) by 0 days.

(21) Appl. No.: 15/116,809

(22) PCT Filed: Feb. 4, 2015

(86) PCT No.: PCT/EP2015/052343
§ 371 (c)(1),
(2) Date: Aug. 4, 2016

(87) PCT Pub. No.: WO2015/118032
PCT Pub. Date: Aug. 13, 2015

(65) Prior Publication Data
US 2016/0339487 A1    Nov. 24, 2016

(30) Foreign Application Priority Data

Feb. 5, 2014   (EP) ..................................... 14154037
Feb. 4, 2015   (WO) ................. PCT/EP2015/052343

(51) Int. Cl.
*B08B 7/00*        (2006.01)
*E01H 8/10*        (2006.01)
(Continued)

(52) U.S. Cl.
CPC ........ *B08B 7/0042* (2013.01); *B23K 26/0006* (2013.01); *B23K 26/0344* (2015.10);
(Continued)

(58) Field of Classification Search
CPC .............. B08B 7/0042; B23K 26/0066; B23K 26/0648; B23K 26/0676; B23K 1/206
See application file for complete search history.

(56) References Cited

U.S. PATENT DOCUMENTS 5,592,879 A  *  1/1997  Waizmann ............ B08B 7/0042
                                                        101/416.1
6,797,918 B1 *  9/2004  Higgins ................ B08B 7/0042
                                                        219/121.68
(Continued)

FOREIGN PATENT DOCUMENTS

EP    0607506 A1    7/1994
EP    1226311 A1    7/2002
FR    2760403 A1 *  9/1998  ........... B08B 7/0042

OTHER PUBLICATIONS

English Machine Translation of FR 2760403 A1.*

Primary Examiner — Mikhail Kornakov
Assistant Examiner — Pradhuman Parihar
(74) Attorney, Agent, or Firm — AEON Law, PLLC; Adam L. K. Philipp; David V. H. Cohen

(57) ABSTRACT

The invention provides a surface cleaning system for cleaning said surface from contaminants, said system comprising a laser device for generating a high intensity laser beam, projection optics for projecting said beam as at least one laser spot on the contaminants, and a control device for determining a longitudinal displacement speed of said surface cleaning system and said surface with respect to one another, and adapted for controlling said laser device and said projecting optics to result in a pattern of laser spots, the laser spots having a spot size, said pattern comprising said laser spots having a spacing of up to the spot size.

11 Claims, 2 Drawing Sheets

(51) Int. Cl.
  *B23K 26/06*   (2014.01)
  *B61C 15/08*   (2006.01)
  *B23K 26/067*  (2006.01)
  *B23K 26/03*   (2006.01)
  *B23K 26/00*   (2014.01)
  *B23K 26/0622* (2014.01)
  *B23K 26/352*  (2014.01)
  *B23K 103/00*  (2006.01)

(52) U.S. Cl.
  CPC ...... *B23K 26/0622* (2015.10); *B23K 26/0648* (2013.01); *B23K 26/0676* (2013.01); *B23K 26/352* (2015.10); *B61C 15/08* (2013.01); *E01H 8/105* (2013.01); *B23K 2103/50* (2018.08)

(56) References Cited

U.S. PATENT DOCUMENTS

| | | | |
|---|---|---|---|
| 8,182,609 B1* | 5/2012 | Le Claire | B08B 7/0042 134/1 |
| 2009/0114625 A1* | 5/2009 | Palmquist | B23K 1/0056 219/121.64 |

\* cited by examiner

SURFACE CLEANING SYSTEM AND METHOD

FIELD OF THE INVENTION

The invention relates to a surface cleaning system and method, in particular for cleaning metal substrates, more in particular for cleaning metal substrates from compacted leaf residue, oils, petro carbon liquids, ice, water, and general soil-based contamination.

BACKGROUND OF THE INVENTION

WO0132990 from one of the current inventors discloses according to its abstract a method of cleaning a rail by removing contaminants from the surface of the rail comprises generating a high intensity pulsed laser beam and directing the laser beam onto the surface of the rail so as to destroy at least part of the contaminants. Preferably the parameters of the laser beam are selected so that the contaminants are destroyed by being converted directly into gases and fine dust particles. The temperature of the contaminants may be raised to at least 6000 degrees Celsius. Apparatus for cleaning a rail by removing contaminants from the surface of the rail comprises means for generating a high intensity pulsed laser beam and means for directing the laser beam onto the surface of the rail so as to destroy at least part of the contaminants. Preferably the apparatus comprises means for selecting the parameters of the laser beam so that the contaminants are destroyed by being converted directly into gases and fine dust particles. The temperature of the contaminants may be raised to at least 6000 degrees Celsius.

SUMMARY OF THE INVENTION

It is an aspect of the invention to identify a significant improvement in the efficiency of using laser beams to ablate material from metal surfaces.

The invention thus provides a significant increase in the efficiency and practical use of lasers beams for ablating material from metal surfaces. To that end, the invention provides a surface cleaning system for cleaning said surface from contaminants, said system comprising a laser device for generating a high intensity laser beam. The system may comprise projection optics for projecting said beam as at least one laser spot on the contaminants. The system may further comprise a control device for determining a longitudinal displacement speed of said surface cleaning system and said surface with respect to one another. The control device may be adapted for controlling said laser device and said projecting optics to result in a pattern of laser spots, the laser spots having a spot size, said pattern comprising said laser spots having a spacing of up to the spot size.

The invention further pertains to a method for cleaning a surface from contaminants using a surface cleaning system, said method comprising determining a mutual displacement speed of said cleaning system and said surface, directing a series of laser spots onto said contaminants, each laser spot comprising sufficient energy for ablation of said contaminants from said surface at least at the area of said laser spots, and providing said laser spots in a pattern of laser spots on said contaminations with said pattern comprising said laser spots having a spacing of up to the spot size.

In the application, reference is made to a laser beam. Many laser devices produce their output in the form of laser pulses. These devices are thus also referred to a pulsed lasers. In this application, when referring to laser beams, it is understood to also include such pulsed lasers.

In general, using a laser, the energy or intensity profile of a laser spot will closely resemble a top hat curve. If the profile has a bell shape, the spot size is defined as the full width at half maximum (FWHM) of the profile. When using for instance diode lasers, in some cases many lased diodes are combined and the output of these laser diodes is combined and coupled in into an optical fibre. When combining laser diodes in such a setting, the resulting spot from the one or more optical fibres will result or closely resemble a top hat beam profile.

A spot will often be almost round, but it may be more elongated or elliptic. Other spot shapes may also be possible and be applied.

Further embodiments are mentioned in the dependent claims, and the description.

It was found, as already mentioned in WO0132990, which is incorporated by reference in this document as if fully set forth, and which is introduced above, that in rail systems, contamination often manifests itself as a coating that sticks to the rails and is difficult to remove.

The current invention has a particular application in cleaning the rails of a rail system. The term "rail system" as used herein encompasses all systems in which wheeled vehicles travel on rails, and in particular railway systems for trains, and tramway, plateway and monorail systems and similar systems.

It is known that, due to the movement of trains in a railway system adjacent to leaves, appreciable amounts of the leaves may be transferred to the top surfaces of the rails and, once there, are compacted by the wheels of the trains into a hard coating on the tops of the rails. Further, lubricating oil, fuel oil, other carbon-based fluids, and grease may be transferred from the trains to the rails, and water and ice may form on the rails by precipitation from the atmosphere or otherwise to form softer coatings. The term "train" as used herein encompasses all forms of railway rolling stock, trams, monorail rolling stock and all vehicles design to travel on rails.

The presence of the hard coating of contaminants such as leaves or the softer coating of contaminants such as lubricating oil, fuel oil, grease, water or ice has two important effects. Firstly, it decreases the traction between the driving wheels of the trains and the rails and, secondly, it can form an electrically insulating layer which prevents continuous electrical connection between the wheels of the train and the rails. Furthermore, it was found to cause additional wear and tear of the wheels and rail.

Preferably the parameters of the laser beam, in particular of each spot, are selected so that the contaminants are destroyed by being converted directly into gases and fine dust. This process is called "ablation". The temperature of the contaminants may be raised to at least 5800 degrees Celsius. More in particular, the temperature is raised to at least 6000 degrees Celsius. In an embodiment, the temperature will remain below 10000 degrees Celsius.

By using a high intensity pulsed laser beam the destruction of the contaminants takes place very quickly. If the rail is part of a rail system on which vehicles run, the laser beam generating system may be mounted on one of the vehicles and operated while the vehicle is running. Since the destruction of the contaminants takes place quickly, it is expected that the vehicle can be run at normal speeds while the destruction process takes place.

In an embodiment, the pulsed laser has a repetition rate and the system has a speed with respect to the surface, and in use the pulse repetition rate relates to the speed in a linear way, wherein the pulse repetition rate increases if the speed increases. It was found that when a pulsed laser is used and the pulse repetition rate is coupled to a vehicle speed in such a linear way, a better cleaning result is achieved.

The invention further relates to a computer program comprising software code portions which, when running on a data processor, configure said data processor to:

The invention further pertains to a signal carrying at least part of this computer program.

The invention further pertains to a signal sequence representing a program for being executed on a computer, said signal sequence representing this computer program.

The term "substantially" herein, like in "substantially consists", will be understood by and clear to a person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally", when used for instance in "functionally coupled" or "functionally direct communication", will be understood by and clear to a person skilled in the art. The term "substantially" may also include embodiments with "entirely", "completely", "all", etc. Hence, in embodiments the adjective substantially may also be removed. Thus, for instance "functionally direct communication" comprises direct, live communication. It may also comprise communication that, from a perspective of the parties communication, is experienced as "live". Thus, like for instance VOIP, there may be a small amount of time between various data packages comprising digital voice data, but these amounts of time are so small that for users it seems as if there is an open communication line or telephone line available.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DESCRIPTION OF PREFERRED EMBODIMENTS

Figure 1:
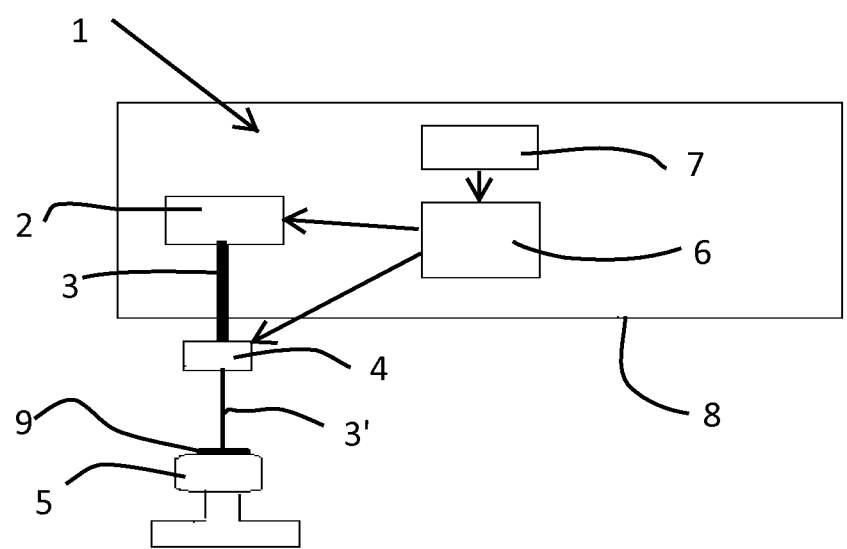
FIG. 1 schematically shows the cleaning system.

In FIG. 1, schematically a cleaning system 1 is depicted. The cleaning system 1 comprises a laser device 2 for generating one or more laser beams 3. The cleaning system further comprises projection optics 4 for modifying the one or more laser beams 3 and projecting these laser beams in laser spots 3' onto contamination 9 that is adhered onto a surface, here the running surface of a rail 5.

The cleaning system 1 comprises a control system 6 that is functionally coupled to the laser device 2, to the projection optics 4, and to at least one sensor 7 for determining a mutual longitudinal displacement speed of the surface to be cleaned and the cleaning system.

Figure 2:
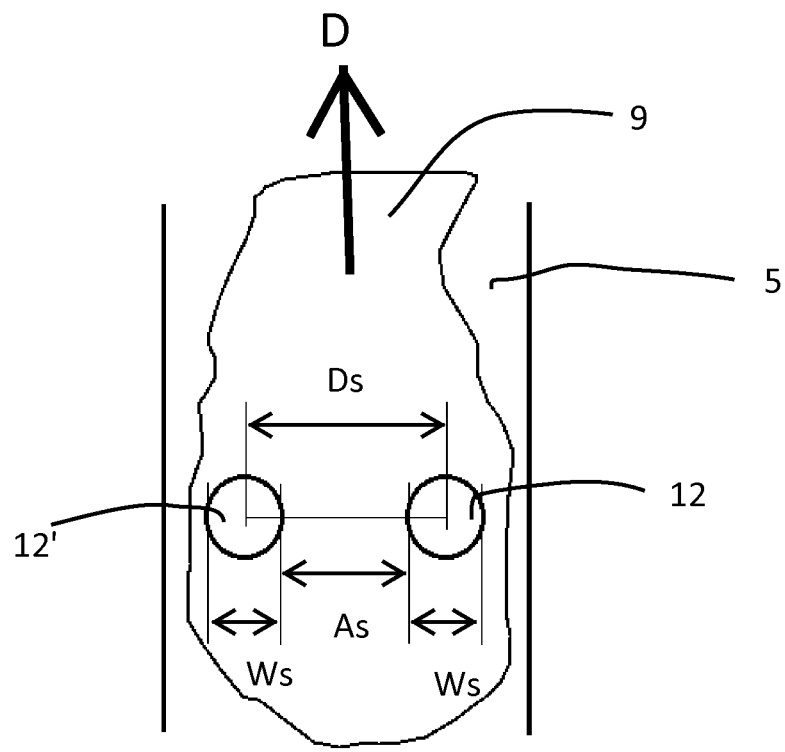
FIG. 2 describes an example of laser spots on a surface.

In FIG. 2, it is shown how the rail 5 on its surface comprises a contamination 9. The cleaning device and the rail surface displace at a mutual longitudinal direction and speed D. The control system 6 determines magnitude of the speed D based upon the sensors 7. In this embodiment, the control system 6 controls the laser device 2 and the projection optics in such a way that here two lateral laser spots 12, 12' are generated. The laser spots 12, 12' will have the same diameters Ws but the mutual diameters can be varied by the control system 6.

The laser spots 12, 12' are at a mutual hart-to-hart distance Ds of which can be varied by control 6 depending on the operational requirement. This results in a spacing As between the laser spots 12, 12' varying in direct proportion. The key aspect is the distance As will always be the radius of the spot 12 or 12', as it was found that the contamination between the spots is effectively also removed. In particular, the control system 6 further controls the laser device 2 and/or the projection optics 4 in such a way, based upon the value of speed D, that in longitudinal direction the spacing between subsequent laser spots is also kept to the distance of the diameter of spot 12 or 12'.

FIG. 1 can for instance illustrate a rail 5 in a railway system adapted to support a wheel of a railway engine, carriage, truck or other vehicle. Such a wheel often has an outer conical surface and a flange. The top surface of the rail often is slightly convex so that the outer conical surface of the wheel normally makes contact with the upper part of the top surface of the rail while the flange of the wheel extends downwardly over the side of the rail 5. Leaves which have been picked up by the passage of the vehicle, or other contaminants such as lubricating oil, fuel oil, grease, water or ice, become formed into a coating 9 which extends over the top surface of the rail 5. In the case of leaves or ice this coating 9 is likely to be hard. If the coating 9 is continuous, the outer conical surface of the wheel will not make contact with the surface of the rail 5. If the coating 9 is electrically insulating (which it usually is) there will not be electrical continuity between the wheel and the rail 5.

In a practical embodiment, the system 1 includes an Nd:YAG (neodymium-yttrium-aluminium-garnet) laser or similar laser generating a beam of wavelength between 1060 and 1064 nanometres, and generating a pulsed beam. The length of each pulse can be between 15 and 100 nanoseconds. The pulse repetition rate can be for instance 25 kHertz. This puts the radiation in the infrared region which is necessary when the contaminants do not absorb a substantial amount of visible light. Alternatively, for instance one or more diode laser may be applied.

The energy in each pulse is in an embodiment at least 1 joule. This gives an average power of the laser beam of at least 50 watts. The peak power with a 10 nanosecond pulse length is for instance at least 100 megawatts. The laser beam energy per pulse per unit area in such an embodiment is 1.5 to 3.5 joules per centimetre squared. The laser beam is focused to a beam diameter of for instance 8 to 15 millimetres cross section.

A laser beam generating system having the above parameters will remove by ablating a coating of contaminants (oil, grease, leaf residue and other general rail head contaminants) of for instance less than 1 millimetre thickness and 1.25 centimetres width on the surface 3 of the rail 1. It is expected that, if a laser beam generating system as described above is mounted on a railway vehicle, a coating 9 of contaminants as above will be destroyed while the vehicle is travelling at speeds of up to the normal speed of a train in service, for instance speeds of up to 160 km per hour.

The spot size can be between 10-1000 micron, in particular 50-500 micron. In an embodiment, the spot size is 50-300 micron. The system will provide an effective cleaning width of 1-10 cm. Specifically when applying the cleaning to rails, the cleaning width can be 1-5 cm. Thus, a pattern may comprise a lateral row of about 10-500 laser spots.

The system can also be use to destroy part or all of a softer or liquid coating of contaminants.

When the laser beam generating system 1 is used on a vehicle in a rail system to remove contaminant from the surfaces of the rails, the laser beam emitted from the head is set to impinge upon the correct portion of the rail surface. If the track of the rails is relatively straight and the vehicle is moving relatively slowly, the position of the laser beam may not need any further adjustment. At higher speeds or on a track with pronounced curves, a control system is required to keep the laser beam correctly aimed at the rail 1 and the coating of contaminant to be removed.

a suitable control system is designed to be included in a cleaning system 1, that further comprises a laser beam generating device as described above and carried on a rail vehicle in a rail system.

It is known that the identity of many substances can be determined by the analysis of the wavelengths of the light in a composite beam reflected off the surface of an object made from the substance by using a spectrometer as described above.

Substances possess unique "signatures" represented by the amounts of light of different wavelengths reflected off their surfaces when irradiated with a light beam of a particular composition of wavelengths. If the light source is arranged to produce a light beam of a particular composition of wavelengths and this composite beam is directed onto the surface of the rail 5 and reflected back, by analysing the outputs of a sensor or sensors it will be possible to determine if the light beam has been reflected off the surface of a coating of leaves or other contaminants, since each contaminant will have a different "signature".

The outputs from the sensor or sensors are supplied to the control system 6 which determines the nature of the substance from which the light beam has been reflected and sends a signal to the laser beam device 2 causing it to apply its beam or spots on the surface to be cleaned when the contaminant is detected and to direct the beam or spots away or switch the beam or spots OFF when no such contaminant is detected.

In an embodiment, the surface cleaning system is part of a laser railhead cleaner (LRC). The Laser Railhead Cleaner (LRC) is a product that has been designed to be mounted in general on any road/rail vehicle, in particular on a railway vehicle for use in cleaning part of the surface of both running rails so as to provide a clean and safe contact surface for trains to operate on.

The LRC is designed to be a self-contained product that is formed on a "flat bed" railway vehicle so it can then be attached to locomotives or other trains (e.g. goods trains) but also has the capability of being designed and installed on a wide variety of trains, metro cars, trams etc.

The LRC works by sending laser beams down to the railhead in a controlled and safe way. It is the laser beams that remove the contamination from the railhead.

Types of contamination that can be removed using this process include but are not limited to impacted leaf residue; carbon-based liquids such as grease, oil, aviation fuel, petrol, paraffin; ice; water; and general dirt and grime.

The operation of the LRC is automatic once the lasers have been turned on and reach a steady state. The train driver simply has to drive his vehicle in the normal way. The driver will have a LRC control box in his cab to inform him of the activity of the laser (on and firing to the track, on but firing to the beam dump, off), and the driver will have the ability to override the system and turn the LRC off at any time.

The LRC product will be certified as meeting the railway standards of the country where it operates, and it will always comply with international laser safety standards.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

The invention claimed is:

1. A rail surface cleaning system for cleaning contaminants from a surface of a rail of a rail system comprising a wheeled vehicle traveling on rails, said rail surface cleaning system comprising:

a laser device designed to be mounted on said wheeled vehicle for generating a high intensity laser beam on said rail while said wheeled vehicle is travelling on said rail;

projection optics for projecting said beam on the contaminants; and a control device for determining a longitudinal displacement speed of said surface cleaning system with respect to said surface of said rail, and adapted for controlling said laser device and said projecting optics to result in:
a pattern of at least two laterally spaced laser spots,
each of said at least two laterally spaced laser spots having a spot size that is a diameter of 50-500 microns, and having an energy of at least 0.5 Joule/cm$^2$,
said pattern comprising a lateral spacing of up to the spot size, and
a longitudinal spacing of up to the spot size between said at least two laterally spaced laser spots and subsequent laser spots, based on the determined longitudinal displacement speed.

2. The system of claim 1, with an energy between 1.5-3.5 Joule/cm$^2$ for each of said at least two laterally spaced laser spots.

3. The system of claim 1, wherein said system is mounted on a train, wherein said surface is a train rail and said system in use has longitudinal displacement speed with respect to said surface, wherein said laser device is provided for in use generating a pulsed laser beam having a pulse repetition rate, and wherein said control device is provided for controlling said pulse repetition rate linearly with respect to said longitudinal displacement speed, wherein the pulse repetition rate increases with an increase in longitudinal displacement speed.

4. The system of claim 1, further comprising a spectrometer configured for determining the identity of contaminants by analysis of wavelengths of light in a composite beam reflected off the surface of said rails.

5. The system of claim 4, further comprising a light source producing a light beam of a composition of wavelengths directed onto the surface of the rail and reflected back, configured for spectrometer analysis of whether the light beam has been reflected off the surface of a coating of leaves or other contaminants.

6. The system of claim 1, wherein the at least two laterally spaced laser spots have the same diameter and wherein the spacing is at least a radius of said laser spots.

7. A method for cleaning a surface of rails of a rail system from contaminants using a rail surface cleaning system, said method comprising:
determining a longitudinal mutual displacement speed of said cleaning system and said surface;
directing a series of laser spots onto said contaminants, each laser spot having a spot size that is a spot diameter of 50-500 microns, and comprising sufficient energy for ablation of said contaminants from said surface at least at the area of said laser spots, wherein the energy is at least 0.5 Joule/cm$^2$, and
providing said laser spots in a pattern of laser spots on said contaminants with said pattern comprising said laser spots having a lateral spacing of up to the spot size; and
further providing a longitudinal spacing of up to the spot size between said laser spots and subsequent laser spots, based on the determined mutual displacement speed.

8. The method of claim 7, wherein said method is applied on a train running on a rail, and said surface is a running surface of said rail, wherein the train runs at a speed of at least 60 km/h.

9. The method of claim 8, wherein a laser beam providing said laser spots has a pulse repetition rate, and wherein said pulse repetition rate adjusts in a linear way to the mutual displacement speed, with said pulse repetition rate increasing with an increasing mutual displacement speed.

10. The method of claim 7, wherein said laser spot comprises energy in the range 1.5-3.5 Joules/cm$^2$.

11. The method of claim 9, wherein said train runs at a speed of at least 90 km/h.

* * * * *